US012689096B2

(12) United States Patent
Jung

(10) Patent No.: US 12,689,096 B2
(45) Date of Patent: Jul. 21, 2026

(54) BATTERY MODULE AND BATTERY PACK INCLUDING THE SAME

(71) Applicant: LG Energy Solution, Ltd., Seoul (KR)

(72) Inventor: Joong Heum Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 650 days.

(21) Appl. No.: 18/004,538

(22) PCT Filed: May 3, 2022

(86) PCT No.: PCT/KR2022/006331
§ 371 (c)(1),
(2) Date: Jan. 6, 2023

(87) PCT Pub. No.: WO2022/235052
PCT Pub. Date: Nov. 10, 2022

(65) Prior Publication Data
US 2023/0253680 A1    Aug. 10, 2023

(30) Foreign Application Priority Data

May 3, 2021 (KR) ........................ 10-2021-0057438
May 2, 2022 (KR) ........................ 10-2022-0054363

(51) Int. Cl.
*H01M 50/503* (2021.01)
*H01M 50/178* (2021.01)
(Continued)

(52) U.S. Cl.
CPC ....... *H01M 50/503* (2021.01); *H01M 50/178* (2021.01); *H01M 50/211* (2021.01); *H01M 50/516* (2021.01)

(58) Field of Classification Search
CPC .......................... H01M 50/503; H01M 50/516
See application file for complete search history.

(56) References Cited

U.S. PATENT DOCUMENTS 11,329,336 B2 * 5/2022 Yamazaki ............. H01M 50/15
2014/0030581 A1 1/2014 Kim
(Continued)

FOREIGN PATENT DOCUMENTS

CN 110770946 A 2/2020
EP 3331059 A1 6/2018
(Continued)

OTHER PUBLICATIONS

Extended European Search Report including Written Opinion for Application No. 22799095.9 dated Sep. 12, 2024, pp. 1-7.
(Continued)

*Primary Examiner* — Amanda C. Walke
(74) *Attorney, Agent, or Firm* — Lerner David LLP

(57) ABSTRACT

A battery module according to an embodiment of the present disclosure includes: a battery cell stack in which a plurality of battery cells are stacked, a busbar frame connected to the battery cell stack, a busbar disposed on the busbar frame, and an electrode lead extending from a battery cell of the battery cell stack and welded to the busbar, wherein the busbar includes at least one or more concave parts recessed toward the center of the busbar, and a protrusion part protruding in a direction opposite to the center of the busbar.

15 Claims, 4 Drawing Sheets

250

(51) Int. Cl.
    *H01M 50/211*    (2021.01)
    *H01M 50/516*    (2021.01)

(56) References Cited

U.S. PATENT DOCUMENTS

| | | | |
|---|---|---|---|
| 2015/0140391 A1 | 5/2015 | Sakate et al. | |
| 2015/0171401 A1 | 6/2015 | Kim et al. | |
| 2018/0194235 A1 | 7/2018 | Kim et al. | |
| 2019/0305284 A1 | 10/2019 | Lee et al. | |
| 2020/0091487 A1* | 3/2020 | Zeng | H01M 50/514 |
| 2020/0144580 A1 | 5/2020 | Hong et al. | |
| 2020/0189400 A1 | 6/2020 | Kim et al. | |
| 2020/0243830 A1* | 7/2020 | Tanaka | H02B 1/20 |
| 2020/0340229 A1 | 10/2020 | Ina et al. | |
| 2020/0350547 A1 | 11/2020 | Chi et al. | |
| 2020/0388814 A1 | 12/2020 | Jang et al. | |
| 2021/0249737 A1 | 8/2021 | Kato | |
| 2022/0045626 A1 | 2/2022 | Sano et al. | |
| 2022/0140448 A1 | 5/2022 | Lee | |

FOREIGN PATENT DOCUMENTS

| | | | | |
|---|---|---|---|---|
| JP | 201191035 | A | 5/2011 | |
| JP | 2011249243 | A | 12/2011 | |
| JP | 2014022195 | A | 2/2014 | |
| JP | 2015095402 | A | 5/2015 | |
| JP | 2015099759 | A | 5/2015 | |
| JP | WO2015012333 | A1 | 3/2017 | |
| JP | 2019169452 | A | 10/2019 | |
| JP | 2020503660 | A | 1/2020 | |
| JP | 2020053152 | A | 4/2020 | |
| JP | 2020518988 | A | 6/2020 | |
| JP | 2020184810 | A | 11/2020 | |
| KR | 20170103232 | A | 9/2017 | |
| KR | 20190040402 | A | 4/2019 | |
| KR | 20200077634 | A | 7/2020 | |
| KR | 20200113845 | A | 10/2020 | |
| WO | WO-2020183817 | A1 * | 9/2020 | H01M 50/50 |

OTHER PUBLICATIONS

International Search Report for Application No. PCT/KR2022/006331 mailed Aug. 11, 2022, 2 pages.
Search Report dated Jul. 30, 2025 from the Office Action for Chinese Application No. 202280006133.2 issued Aug. 1, 2025, pp. 1-2.

* cited by examiner

【FIG. 1】
10
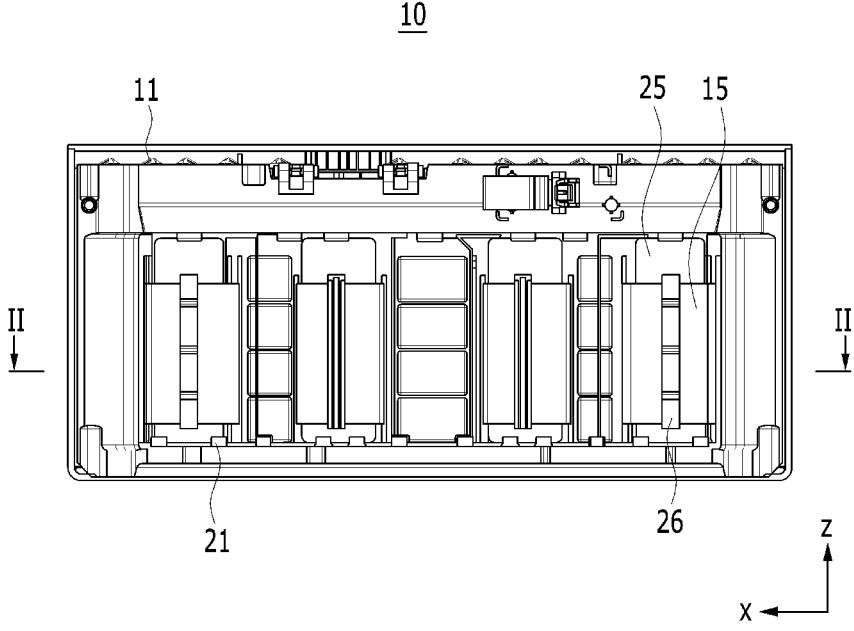
【FIG. 2】
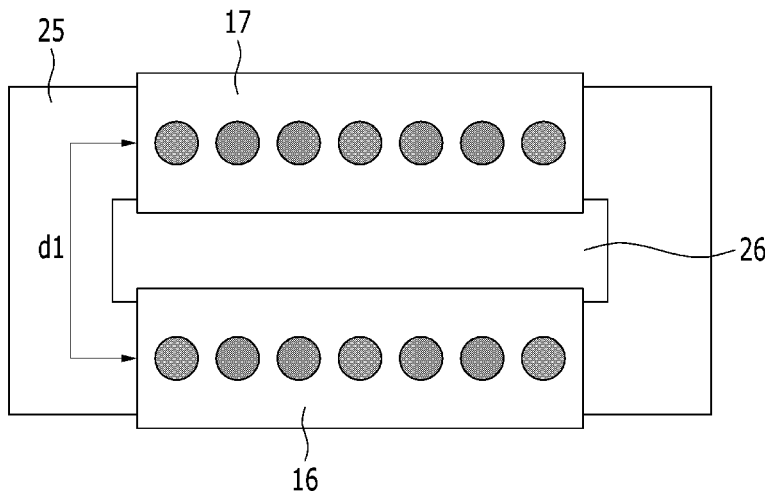

【FIG. 3】
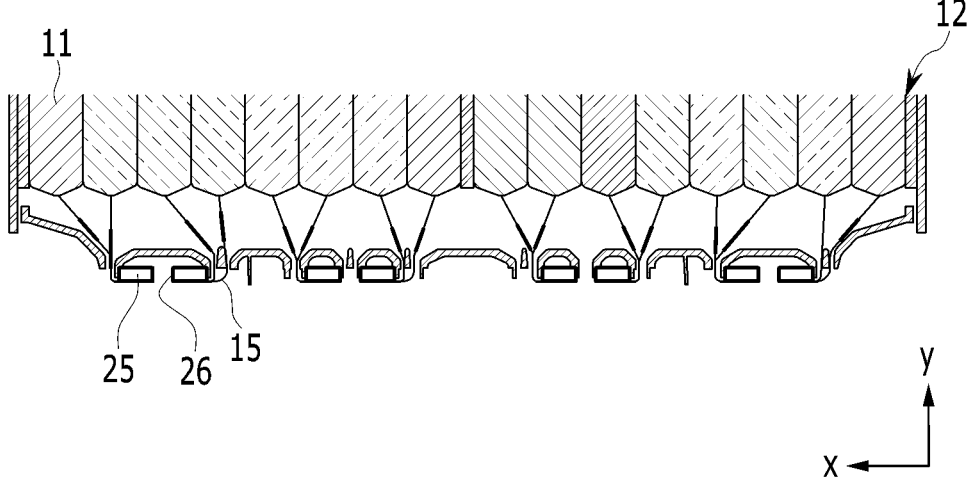
【FIG. 4】
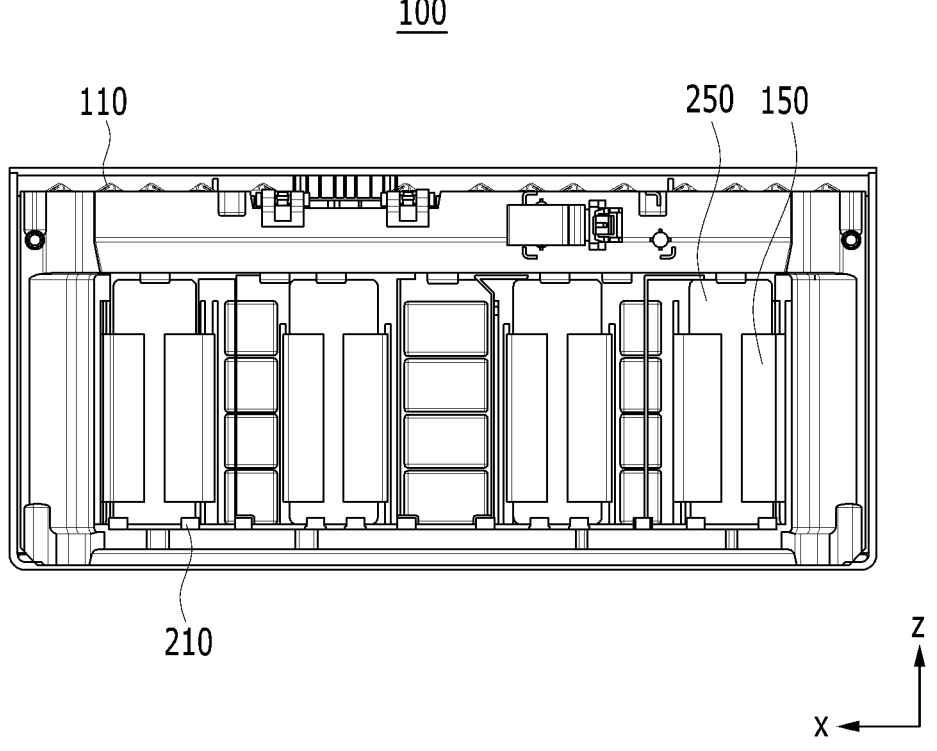

【FIG. 5】
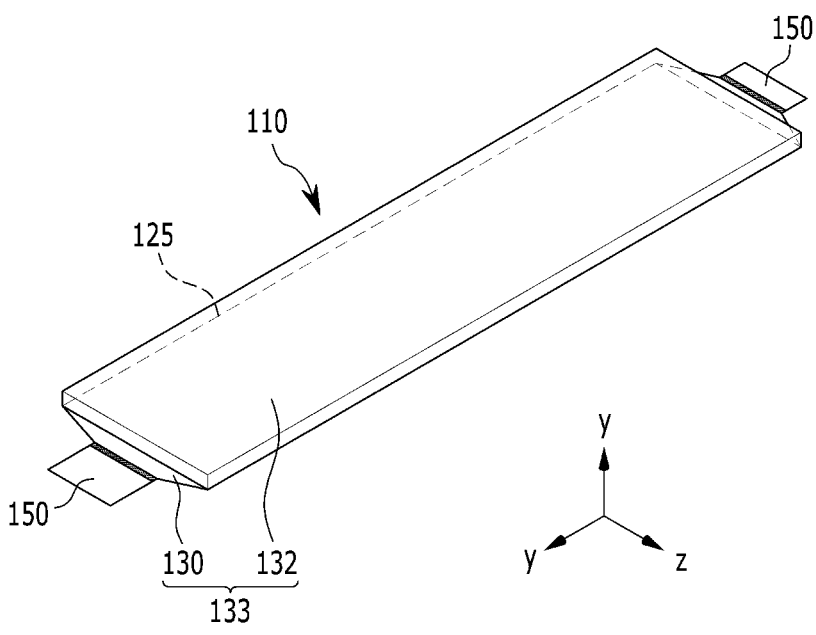
【FIG. 6】
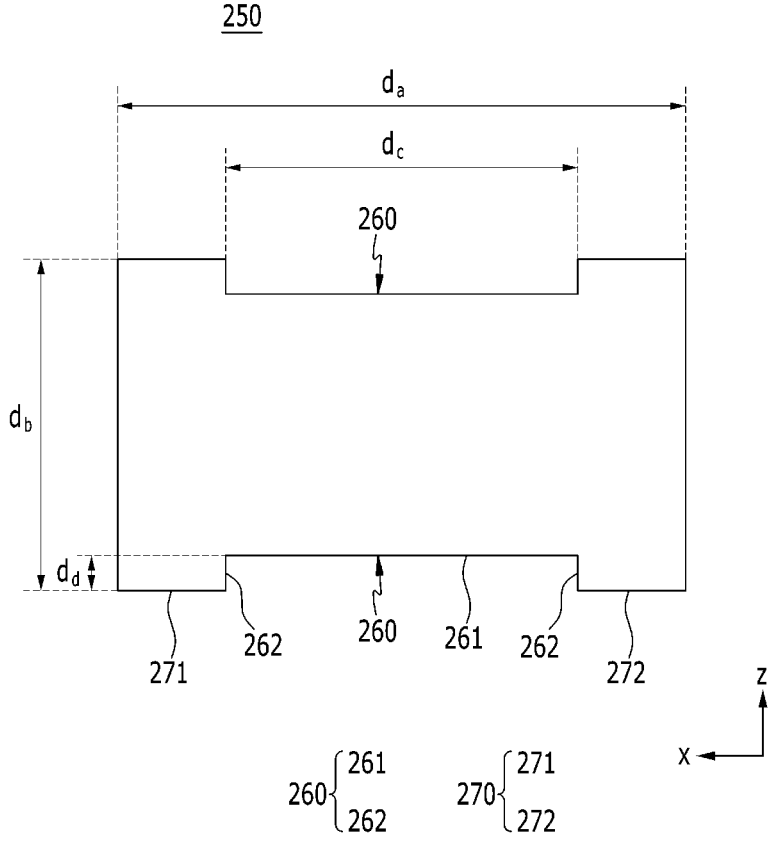

【FIG. 7】
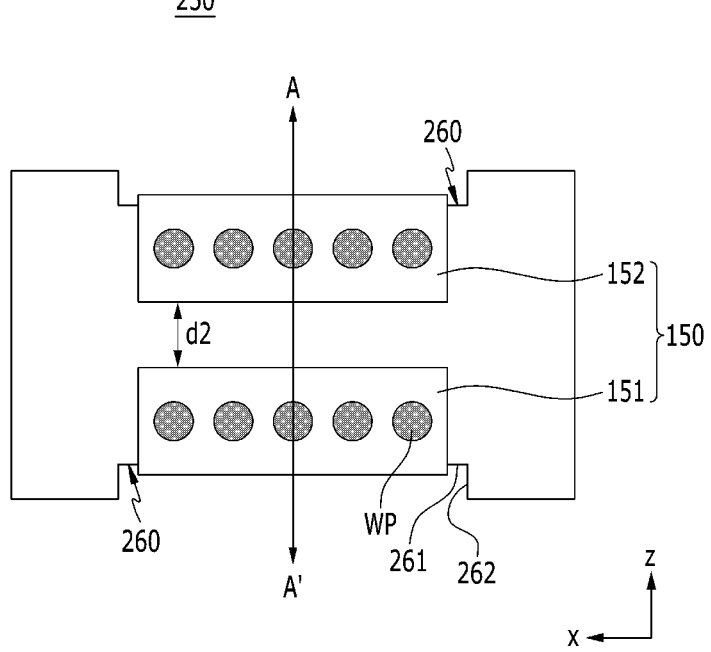
【FIG. 8】
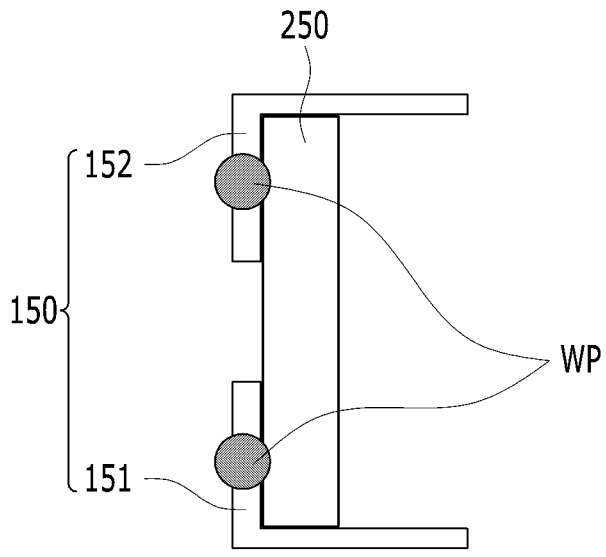

BATTERY MODULE AND BATTERY PACK INCLUDING THE SAME

CROSS CITATION WITH RELATED APPLICATION(S)

This application claims the benefit of Korean Patent Application No. 10-2021-0057438 filed on May 3, 2021 and Korean Patent Application No. 10-2022-0054363 filed on May 2, 2022 in the Korean Intellectual Property Office, the contents of which are incorporated herein by reference in their entirety.

TECHNICAL FIELD

The present disclosure relates to a battery module and a battery pack including the same, and more particularly, to a battery module with improved busbar structure and a battery pack including the same.

BACKGROUND

Along with the technology development and increased demand for mobile devices, demand for secondary batteries as energy sources has been increasing rapidly. Accordingly, research on batteries capable of meeting various demands are being performed.

A secondary battery has attracted considerable attention as an energy source for power-driven devices, such as an electric bicycle, an electric vehicle, and a hybrid electric vehicle, as well as an energy source for mobile devices, such as a mobile phone, a digital camera, and a laptop computer.

Recently, along with a continuous rise of the necessity for a large-capacity secondary battery structure, including the utilization of the secondary battery as an energy storage source, there is a growing demand for a battery pack of middle- or large-sized module structure which is an assembly of battery modules in which a plurality of secondary batteries are connected in series or in parallel.

Meanwhile, when a plurality of battery cells are connected in series or in parallel to configure a battery pack, a method of configuring a battery module composed of at least one battery cell and then adding other components to at least one battery module to configure a battery pack is common.

When connecting a battery cell stack and a busbar in the battery module, the shape of the busbar may have a great influence on the output of the battery module. The conventional battery module is configured such that the shape of the busbar is a square shape that the central part is opened, and a pair of electrode leads are welded and connected to the busbar. The current flowing between the electrode leads welded and connected to the busbar moves clockwise or counterclockwise around the busbar, so that the longer the moving distance of the current, the greater the resistance, which ultimately causes a problem that the output of the battery module is lowered. Therefore, it is necessary to improve the output of the battery module by designing a busbar configuration in which the current movement path between the electrode leads can be formed short.

FIG. 1 is a diagram showing a state in which a busbar according to a comparative example is mounted on a battery module. FIG. 2 is a diagram showing a front surface of a busbar according to a comparative example. FIG. 3 is a cross-sectional view taken along the cutting line II-II' of FIG. 1.

Referring to FIGS. 1 to 3, the battery module 10 according to the comparative example may include a battery cell stack 12 in which a plurality of battery cells 11 are stacked, electrode leads 15 respectively protruding from both ends of the battery cell stack 12, a busbar frame 21, and a busbar 25. The busbar frame 21 includes lead slits, wherein the lead slits are aligned so as to correspond to a slit 26 formed in the busbar 25, and the electrode lead 15 may be electrically connected to the busbar 25.

The busbar 25 according to the comparative example includes a slit 26 through which the electrode lead 15 can pass. The busbar 25 may be in the form of a flat plate including a slit 26 having an open center.

The pair of electrode leads 15 may include a first electrode lead 16 and a second electrode lead 17, wherein the first electrode lead 16 and the second electrode lead 17 can be electrically connected to the busbar 25. As shown in FIG. 2, the adjacent first electrode lead 16 and second electrode lead 17 are inserted so as to pass through the slit 26 or inserted so as to pass between the busbars 25, and then welded and electrically connected to one surface of the busbar 25. A current may flow from the first electrode lead 16 to the second electrode lead 17 through the busbar 25, wherein the shortest moving distance of the current between the first electrode lead 16 and the second electrode lead 17 may be d1. The shortest moving distance d1 of the current may be a path through which the current moves clockwise or counterclockwise around the busbar 25 based on the shape of the busbar.

DETAILED DESCRIPTION OF THE INVENTION

Technical Problem

It is an object of the present disclosure to provide a battery module that has improved output by reducing the current movement path between the electrode leads as compared with a conventional one, and a battery pack including the same.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there is provided a battery module comprising: a battery cell stack in which a plurality of battery cells are stacked, a busbar frame connected to the battery cell stack, a busbar disposed on the busbar frame, and an electrode lead extending from a battery cell of the battery cell stack and welded to the busbar, wherein the busbar comprises at least one or more concave parts recessed toward the center of the busbar, and a protrusion part protruding in a direction opposite to the center of the busbar.

The concave part may include a first edge part that is one surface extending in the first direction, and a second edge part that is one surface extending in the second direction.

A length of the first edge part may be shorter than an overall length of the busbar extending in the first direction.

A length of the second edge part may be shorter than an overall length of the busbar extending in the second direction.

The first edge part and the second edge part may be perpendicular to each other.

The protrusion part may include a first protrusion part and a second protrusion part disposed on both sides of the concave part.

The second edge part of the concave part forms a part of the protrusion part.

The busbar may have an H shape.

Two concave parts recessed toward directions facing each other are formed in the busbar, and the electrode lead may be coupled to the busbar so as to wrap the concave part.

The electrode lead includes a first electrode lead and a second electrode lead that wrap each of the two concave parts, and the first electrode lead and the second electrode lead may be bent in the concave part and make contact with one surface of the busbar.

An end part of the first electrode lead and an end part of the second electrode lead may be spaced apart from each other and make contact with one surface of the busbar.

Each of the battery cells includes an electrode lead protruding toward the busbar frame, and two electrode leads protruding from battery cells adjacent to each other among the electrode leads may pass between the plurality of busbars and make contact with one surface of the busbar.

the two electrode leads include a first electrode lead and a second electrode lead, and the first electrode lead and the second electrode lead may each pass between the concave parts and make contact with one surface of the busbar.

The concave part includes a first edge part that is one surface extending in the first direction, and a width of the electrode lead may be equal to or smaller than a length of the first edge part.

A welding part may be formed at a portion where the electrode lead and the busbar overlap.

According to another embodiment of the present disclosure, there is provided a battery pack comprising: at least one battery module described above, and a pack case for packaging the at least one battery module.

Advantageous Effects

According to embodiments, by changing the shape of the busbar, the movement path of a current flowing between the electrode leads can be changed, thereby reducing the resistance of the battery module and improving the output.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a diagram showing a state in which a busbar according to a comparative example is mounted on a battery module;

FIG. 2 is a diagram showing a front surface of a busbar according to a comparative example;

FIG. 3 is a cross-sectional view taken along the cutting line II-II' of FIG. 1;

FIG. 4 is a diagram showing a state in which a busbar according to an embodiment of the present disclosure is mounted on a battery module;

FIG. 5 is a perspective view of a battery cell included in a battery module according to an embodiment of the present disclosure;

FIGS. 6 and 7 are front views showing a busbar according to an embodiment of the present disclosure; and FIG. 8 is a cross-sectional view taken along the cutting line A-A' of FIG. 7.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and same reference numerals designate same or like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the description, when a portion is referred to as "including" or "comprising" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

FIG. 4 is a diagram showing a state in which a busbar according to an embodiment of the present disclosure is mounted on a battery module.

Referring to FIG. 4, the battery module 100 according to an embodiment of the present disclosure may include a battery cell stack in which a plurality of battery cells 110 are stacked, electrode leads 150 respectively protruding from both ends of the battery cell stack, a busbar frame 210, and a busbar 250. The electrode lead 150 is protruded toward the busbar frame 210 and can be electrically connected to the busbar 250.

FIG. 5 is a perspective view of a battery cell included in a battery module according to an embodiment of the present disclosure.

Next, the configuration of one battery cell 110 will be described with reference to FIG. 5. The battery cell 110 is a secondary battery and can be configured into a pouch-type secondary battery. The battery cells 110 can be configured in plural numbers, and the plurality of battery cells 110 can be stacked so as to be electrically connected to each other, thereby forming a battery cell stack. The plurality of battery cells 110 may include an electrode assembly 125, a cell case 133, and an electrode lead 150 protruding from the electrode assembly 125, respectively.

The electrode assembly 125 may be composed of a positive electrode plate, a negative electrode plate, a separator, and the like. The cell case 133 is for packaging the electrode assembly 125, and can be composed of a laminated sheet including a resin layer and a metal layer. Such a cell case 133 may include a case main body 132 and a cell terrace 130. The case main body 132 may house the electrode assembly 125. For this purpose, the case main body 132 is provided with a housing space capable of housing the electrode assembly 125. The cell terrace 130 extends from the case main body 132 and is sealed so as to seal the electrode assembly 125. The electrode leads 150 may be partially protruded from one side and the other side of the cell terrace 130, specifically, in the front and rear directions (y-axis direction) of the cell terrace 130.

The electrode lead 150 can be electrically connected to the electrode assembly 125. Such electrode leads 150 may be formed in a pair. A part of the pair of electrode leads 150 may protrude out of the cell terrace 130 in front and rear (y-axis direction) of the cell case 133, respectively. The configuration of the battery cell 110 described above is an example, and the shape of the battery cell 110 for configuring the battery cell stack may be modified in various ways.

FIGS. 6 and 7 are front views showing a busbar according to an embodiment of the present disclosure, and FIG. 8 is a cross-sectional view taken along the cutting line A-A' of FIG. 7.

Referring to FIGS. 6 to 7, the busbar 250 according to an embodiment of the present disclosure may include a concave part 260 and a protrusion part 270. Further, the busbar 250 according to an embodiment of the present disclosure may not be opened in a central part and may not include a slit, unlike the conventional busbars of FIGS. 1 and 2.

Specifically, the busbar 250 according to an embodiment of the present disclosure may include a concave part 260 recessed from one edge of the busbar 250 toward the central part. The concave parts 260 may be formed by at least one or more recesses. Preferably, the concave parts 260 may be formed at both corners of the busbar 250 recessed toward directions facing each other.

The concave part 260 may include a first edge part 261 and a second edge part 262.

The first edge part 261 may be a surface extending in the first direction (x-axis direction) to form a concave part. The length de of the first edge part may be shorter than the overall length da of the busbar on which the first edge part 261 is located. That is, the length de of the first edge part may be shorter than the overall length da of the busbar 250 including both the concave part 260 and the protrusion part 270.

The second edge part 262 may be a surface extending in the second direction (z-axis direction) to form a concave part. A length da of the second edge part may be shorter than an overall length db of the busbar extending in the second direction. That is, the length da of the second edge part may be shorter than the entire length db of the busbar on which the second edge part 262 is located. Further, the second edge part 262 may form a part of the protrusion part 270.

The first edge part 261 and the second edge part 262 may be perpendicular to each other.

The protrusion part 270 may be a region protruding in a direction opposite to the center of the busbar 250 as compared to the concave part 260. The protrusion part 270 may include a first protrusion part 271 and a second protrusion part 272 each including a second edge part 262 of the concave part 260. That is, the first protrusion part 271 and the second protrusion part 272 may be disposed on both sides of the concave part 260. In this case, the protrusion part 270 may be protruded as much as the length da of the second edge part as compared to the concave part 260.

That is, the concave part 260 is located between the first protrusion part 271 and the second protrusion part 272. Therefore, the busbar 250 including the concave part 260 and the protrusion part 270 may be formed in an H-shaped structure.

Referring to FIGS. 4, 7 and 8, a pair of electrode leads 150 may be coupled to the busbar 250 according to an embodiment of the present disclosure. Two electrode leads 150 protruding from battery cells 110 adjacent to each other among the electrode leads 150 can pass between the plurality of busbars 250 and be located in contact with one surface of the busbars 250. In this case, a pair of electrode leads 150 may be welded and electrically coupled to the busbar 250, and may include at least one welding part WP. Therefore, the busbar 250 can include the plurality of welding parts WP, thereby improving the fixing force between the busbar 250 and the battery cell 110 and thus increasing the durability of the battery.

The electrode lead 150 can be coupled to the concave part 260 of the busbar 250. The two electrode leads 150 protruding from the battery cells 110 adjacent to each other among the electrode leads 150 can pass between the concave parts 260 and be located in contact with one surface of the busbar 250. Specifically, the electrode lead 150 may include a first electrode lead 151 and a second electrode lead 152, respectively.

The electrode lead 150 may be located while wrapping the concave part 260. The busbar 250 may include two concave parts 260 recessed toward directions facing each other, wherein the first electrode lead 151 and the second electrode lead 152 may be located while wrapping each of the two concave parts 260. More specifically, the first electrode lead 251 and the second electrode lead 152 may be bent in the concave part 260 and be located while making contact with one surface of the busbar 250. At this time, the end part of the first electrode lead 151 and the end part of the second electrode lead 152 may be spaced apart from each other and be located while making contact with one surface of the busbar 250.

The width of the electrode lead 150 may be equal to or smaller than the length of the edge constituting the concave part 260. Specifically, the width of the electrode lead 150 may be equal to or smaller than the length da of the first edge part constituting the concave part 260.

Current can flow from the first electrode lead 151 to the second electrode lead 152 through the busbar 250, wherein the moving distance d2 of the current between the first electrode lead 151 and the second electrode lead 152 can be minimized. That is, the shortest moving distance d2 of the current according to the present embodiment may be relatively short as compared to the shortest moving distance d1 of the current of FIG. 1 according to the comparative example. This is because in the comparative example, the current moves along the shape of the busbar 25 to correspond to the edge of the busbar 25, whereas in an embodiment of the present disclosure, the current moves from the first electrode lead 151 to the second electrode lead 152 across the center of the busbar 250. That is, the shortest moving distance of the current may vary depending on the shape of the busbar 250. As the shortest moving distance of the current is reduced, the internal resistance of the battery may also be reduced. Therefore, the battery according to the present embodiment can have reduced internal resistance, and can have increased output and battery capacity of the battery module as compared to the battery according to the comparative example. Additionally, since the manufacturing cost of the busbar is the same as compared to the conventional case, it is possible to produce a battery having an improved output without a separate cost increase.

Meanwhile, one or more battery modules according to the embodiments of the present disclosure can be packaged in a pack case to form a battery pack.

The above-mentioned battery module and the battery pack including the same can be applied to various devices. Such a device may be applied to a vehicle means such as an electric bicycle, an electric vehicle, or a hybrid vehicle, but the present disclosure is not limited thereto, and is applicable to various devices that can use a battery module and the battery pack including the same, which also belongs to the scope of the present disclosure.

Although preferred embodiments of the present disclosure have been shown and described above, the scope of the present disclosure is not limited thereto, and numerous other variations and modifications can be made by those skilled in the art using the basic principles of the invention defined in the appended claims, which also falls within the spirit and scope of the invention.

DESCRIPTION OF REFERENCE NUMERALS

100: battery module
110: battery cell
150: electrode lead
151: first electrode lead
152: second electrode lead
210: busbar frame
250: busbar
260: concave part
270: protrusion part

The invention claimed is:

1. A battery module comprising:
a battery cell stack;
a busbar frame connected to the battery cell stack;
a busbar disposed on the busbar frame; and
an electrode lead extending from a battery cell of the battery cell stack and welded to the busbar,
wherein the busbar comprises at least one concave part recessed toward the center of the busbar, and a protrusion part protruding in a direction opposite to a center of the busbar, and
wherein the at least one concave part includes two concave parts, the two concave parts being recessed in a direction facing each other, and the electrode lead is coupled to the busbar so as to wrap the two concave parts.

2. The battery module of claim 1, wherein:
the concave part comprises a first edge part defining one surface extending in a first direction, and a second edge part defining another surface extending in a second direction.

3. The battery module of claim 2, wherein:
a length of the first edge part is shorter than an overall length of the busbar extending in the first direction.

4. The battery module of claim 2, wherein:
a length of the second edge part is shorter than an overall length of the busbar extending in the second direction.

5. The battery module of claim 2, wherein:
the first edge part and the second edge part are perpendicular to each other.

6. The battery module of claim 2, wherein:
the protrusion part comprises a first protrusion part and a second protrusion part disposed on both sides of the concave part.

7. The battery module of claim 5, wherein:
the second edge part of the concave part forms a part of the protrusion part.

8. The battery module of claim 2, wherein:
the busbar has an H shape.

9. The battery module of claim 1, wherein:
the electrode lead includes a first electrode lead and a second electrode lead that wrap each of the two concave parts, and
the first electrode lead and the second electrode lead are bent in the concave part and make contact with one surface of the busbar.

10. The battery module of claim 9, wherein:
an end part of the first electrode lead and an end part of the second electrode lead are spaced apart from each other and make contact with one surface of the busbar.

11. The battery module of claim 1, wherein:
each of the battery cells comprises an electrode lead protruding toward the busbar frame, and two electrode leads protruding from battery cells adjacent to each other among the electrode leads pass between the plurality of busbars and make contact with one surface of the busbar.

12. The battery module of claim 11, wherein:
the two electrode leads comprises a first electrode lead and a second electrode lead, and
the first electrode lead and the second electrode lead each pass between the at least one concave part and make contact with one surface of the busbar.

13. The battery module of claim 1, wherein:
the concave part comprises a first edge part that defines one surface extending in a first direction, and
a width of the electrode lead is equal to or smaller than a length of the first edge part.

14. The battery module of claim 1, wherein:
a welding part is formed at a portion where the electrode lead and the busbar overlap.

15. A battery pack comprising:
at least one battery module of claim 1, and
a pack case for packaging the at least one battery module.

* * * * *